(12) United States Patent
Nitka

(10) Patent No.: US 10,706,089 B2
(45) Date of Patent: Jul. 7, 2020

(54) TECHNIQUES FOR TIME INTERSECTION

(71) Applicant: Facebook, Inc., Menlo Park, CA (US)

(72) Inventor: Bartosz Tomasz Nitka, London (GB)

(73) Assignee: FACEBOOK, INC., Menlo Park, CA (US)

( * ) Notice: Subject to any disclaimer, the term of this patent is extended or adjusted under 35 U.S.C. 154(b) by 282 days.

(21) Appl. No.: 15/813,552

(22) Filed: Nov. 15, 2017

(65) Prior Publication Data

US 2019/0147101 A1    May 16, 2019

(51) Int. Cl.
| | | |
|---|---|---|
| *G06F 16/00* | (2019.01) | |
| *G06F 16/33* | (2019.01) | |
| *H04L 12/58* | (2006.01) | |
| *G06F 16/48* | (2019.01) | |
| *G06F 16/2455* | (2019.01) | |
| *G06F 16/2458* | (2019.01) | |
| *G06F 40/00* | (2020.01) | |
| *G06F 40/55* | (2020.01) | |
| *G06F 40/284* | (2020.01) | |
| *G06Q 10/10* | (2012.01) | |

(52) U.S. Cl.
CPC ...... *G06F 16/3344* (2019.01); *G06F 16/2456* (2019.01); *G06F 16/2474* (2019.01); *G06F 16/489* (2019.01); *G06F 40/00* (2020.01); *G06F 40/284* (2020.01); *G06F 40/55* (2020.01); *H04L 51/046* (2013.01); *H04L 51/32* (2013.01); *G06Q 10/109* (2013.01)

(58) Field of Classification Search
CPC .................................................. G06F 16/3344
See application file for complete search history.

(56) References Cited

FOREIGN PATENT DOCUMENTS

WO    WO-2008064281 A2 *   5/2008    ......... H04L 12/1854

\* cited by examiner

*Primary Examiner* — Ajith Jacob

(57) ABSTRACT

Techniques to intersect time information include receiving a set of time tokens, the set of time tokens comprising at least a first time token and a second time token; performing a compatibility check of joining the first time token and the second time token into a combined time token; and performing a join attempt of joining the first time token and the second time token into the combined time token where the compatibility check is positive. Other embodiments are described and claimed.

17 Claims, 11 Drawing Sheets

600

RECEIVE A SET OF TIME TOKENS, THE SET OF TIME TOKENS COMPRISING AT LEAST A FIRST TIME TOKEN AND A SECOND TIME TOKEN
602

PERFORM A COMPATIBILITY CHECK OF JOINING THE FIRST TIME TOKEN AND THE SECOND TIME TOKEN INTO A COMBINED TIME TOKEN
604

PERFORM A JOIN ATTEMPT OF JOINING THE FIRST TIME TOKEN AND THE SECOND TIME TOKEN INTO THE COMBINED TIME TOKEN WHERE THE COMPATIBILITY CHECK IS POSITIVE
606

RESOLVE THE COMBINED TIME TOKEN TO A MOST-RECENT TIME INSTANCE
608

PROVIDE THE MOST-RECENT TIME INSTANCE TO A MESSAGING-BASED SERVICE
610

*FIG. 6*

TECHNIQUES FOR TIME INTERSECTION

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc. The messaging system may provide access to further functionality beyond messaging, for example, by detecting time information in messages that can be used to perform other functions such as creating a calendar event, creating a reservation at a restaurant or travel service, or buying tickets to an event. However, time information in natural language may need further processing in order to be useful for such functions.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for time intersection. Some embodiments are particularly directed to techniques for time intersection of natural language tokens detected in a messaging system. In one embodiment, for example, an apparatus may comprise a time processing interface component operative to receive a set of time tokens, the set of time tokens comprising at least a first time token and a second time token; a time token compatibility component operative to perform a compatibility check of joining the first time token and the second time token into a combined time token; and a time token join component operative to perform a join attempt of joining the first time token and the second time token into the combined time token where the compatibility check is positive. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
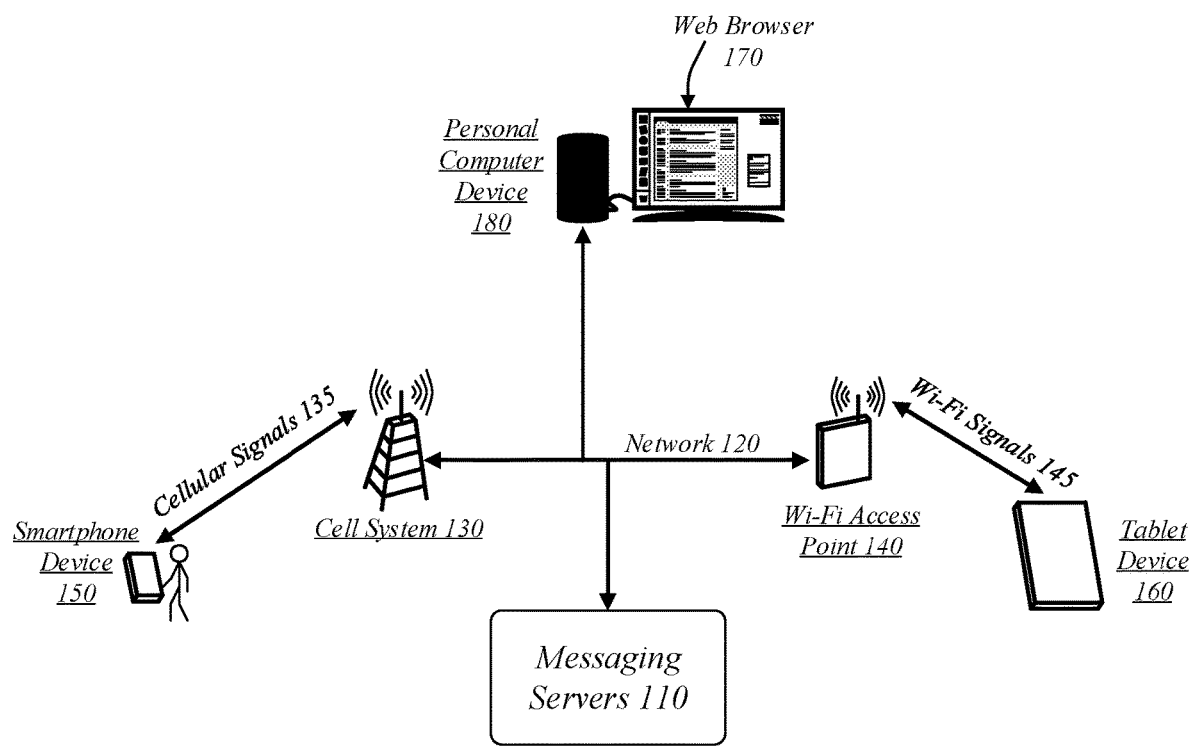
FIG. 1 illustrates an embodiment of a time intersection system.

Users may enter time information in natural language text. It may be beneficial to the users of a computer system for natural language expressions of time information to be correctly recognized and interpreted. A correctly-interpreted natural language time expression may be used to provide services to a user. For example, a calendar entry may be made, a reminder may be set, a service may be configured for the user to occur at a requested time, or other services related to a particular time may be performed.

A time may be represented as a time token, where the time token specifies one or more parameters. For example, a time token may have specified a time of day, a day of the year, a year, or any other time elements. Certain time indicators may also be left unspecified, such as by having a specified time of day (e.g., 4 pm), while having an unspecified day of the year.

In some cases, multiple time tokens may be detected. Some of these may be merged, such as when a time of day is detected and a day of the year is detected, such that combining them produces a particular time of day on a particular day of the year (e.g., "let's meet June $4^{th}$ at 8 pm", or "I'll see you on Tuesday the $6^{th}$").

However, in other cases, multiple time tokens should not be merged, such as where a user lists multiple times of day (e.g., "I'm available at 10 am, 11 am, and 12 pm"). Some tokenization processes may benefit from the use of infinite series representing all possible times matching a token: for example, the text "Tuesday 4 pm" may be represented by an infinite series of all 4 pm times on every possible Tuesday. However, some intersections of these infinite series, used to combine detected tokens, may be computationally expensive to determine, particularly where the infinite series have no intersections (e.g., combining 4 pm and 11 am). Previous attempts to merge time tokens that do not overlap could cause a system to enter an infinite comparison sequence, e.g. to determine if 10 am and 11 am ever intersect in the future or in the past. Such attempts might need a coded maximum number of attempts or other intervention in order to prevent wasting further processing resources, and were still inefficient at determining whether two time tokens could be merged.

As such, accurate natural language interpretation of time statements may improve the performance of a network services system, such as a messaging system or social-networking system, in serving its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a time intersection system 100. In one embodiment, the time intersection system 100 may comprise a computer-implemented system having software applications comprising one or more components. Although the time intersection system 100 shown in FIG. 1 has a limited number of elements in a certain topology, it may be appreciated that the time intersection system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or any other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases, a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. In some embodiments, users can select whether a particular message thread uses end-to-end encryption (and thereby receive the additional privacy of the messaging servers being prevented from accessing the contents of messages) or doesn't (and thereby receive the benefit of the messaging system being able to programmatically access messages for the purpose of offering relevant services to the users).

The messaging system may use knowledge generated from interactions between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

A messaging system, which may include a time intersection system 100, may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 235 may be interpreted as using the NIC for network access to a communications network for the transmission or reception of information.

Figure 2:
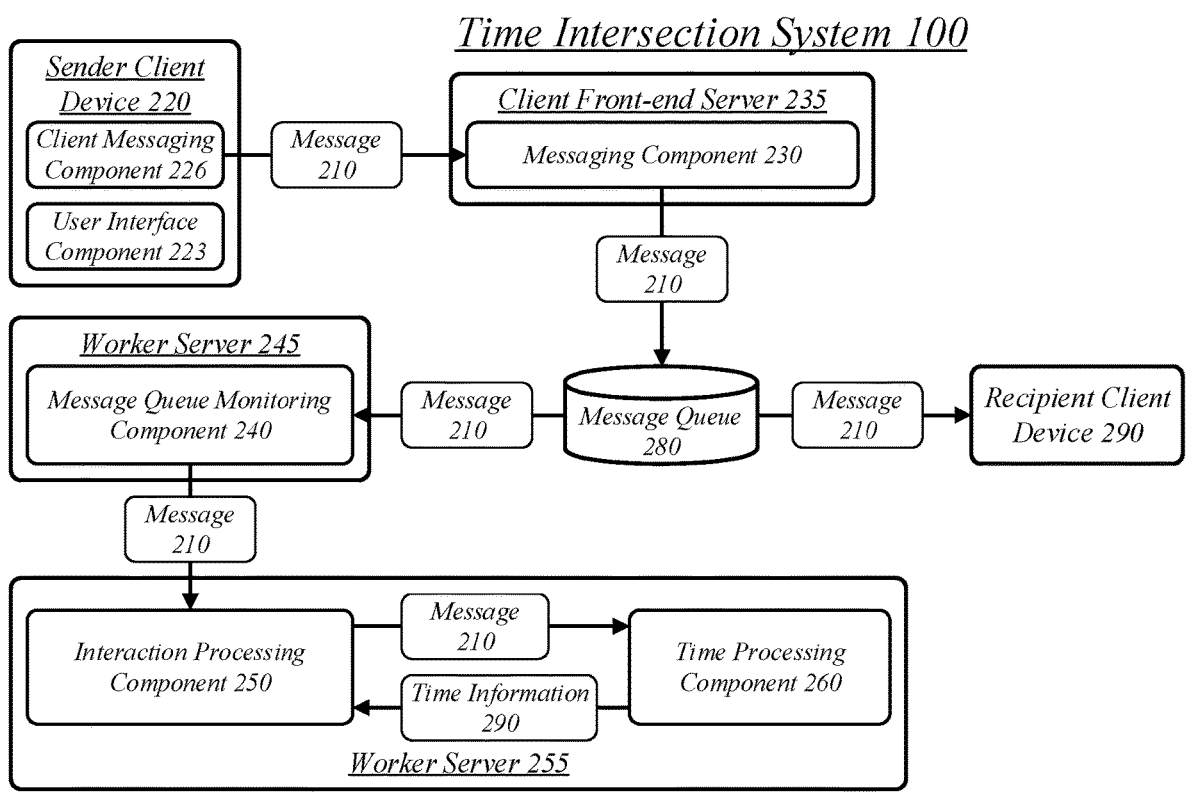
FIG. 2 illustrates an embodiment of a time intersection system processing a message.

FIG. 2 illustrates an embodiment of a time intersection system 100 processing a message 210.

A messaging client may comprise a user interface component 223. A user interface component 223 may be generally arranged to display user interfaces to a user of a client device and to receive user commands for the messaging client for the client device. A messaging client may comprise a client messaging component 226. A client messaging component 226 may be generally arranged to conduct messaging interactions on the behalf of the messaging client via communication with the client front-end server 235.

A client front-end server 235 may be generally arranged to act as a network access point to the messaging system for client devices such as sender client device 220. The client front-end server 235 may comprise a messaging component 230, the messaging component 230 generally arranged to act as a network access point to messaging services for the messaging system. The messaging component 230 may receive messages from client devices and add the messages to message queues.

A message queue 280 may be specifically associated with the user of sender client device 220, such as by being uniquely associated within the messaging system with a user account for the user of sender client device 220. The message queue 280 may be a single queue used for all messaging endpoints used by this user. The message queue 280 may comprise a representation of updates in a strict linear order. The message queue 280 may be organized as a data unit according to a variety of techniques. The message queue 280 may be stored in semi-persistent memory, persistent storage, both semi-persistent memory and persistent storage, or a combination of the two. The message queue 280 may be organized according to a variety of data structures, including linked lists, arrays, and other techniques for organizing queues. The message queue 280 may generally comprise a first-in-first-out (FIFO) queue in which no update will be removed or retrieved from the queue before any updates that were received prior to it.

The messaging system may comprise one or more worker servers, such as worker servers 245, 255. In general, the messaging system may comprise a plurality of worker servers that may be assigned to various tasks. A worker server 245 may comprise a message queue monitoring component 240, the message queue monitoring component 240 arranged to monitor updates, such as may comprise messages, in the message queue 280 and other message queues of the messaging system for various flags, indicators, and other information.

The message queue monitoring component 240 monitors a messaging interaction. This messaging interaction is exchanged via a messaging system. This messaging interaction involving at least one client device, such as a sender client device 220 and/or a recipient client device 290. A message 210 may be sent from a client messaging component 226 of a messaging client on a sender client device 220. This message 210 is associated with a message thread, the message thread involving two or more participants, including the user of the sender client device 220. This message 210 comprises a portion of the messaging interaction of a message thread.

The message 210 is received by the messaging component 230 of the client front-end server 235 and is added to a message queue 280 associated with the sender. The message 210 is distributed using the message queue 280 to the recipient client device 290. The message queue monitoring component 240 also receives the message 210 and provides it to the interaction processing component 250.

A worker server 255 may comprise an interaction processing component 250, the interaction processing component 250 operative to generate information relating to a received message 210. The worker server 255 may comprise a time processing component 260, the time processing component 260 operative to generate time information 290 from a received message 210, as will be described further below.

Figure 3:
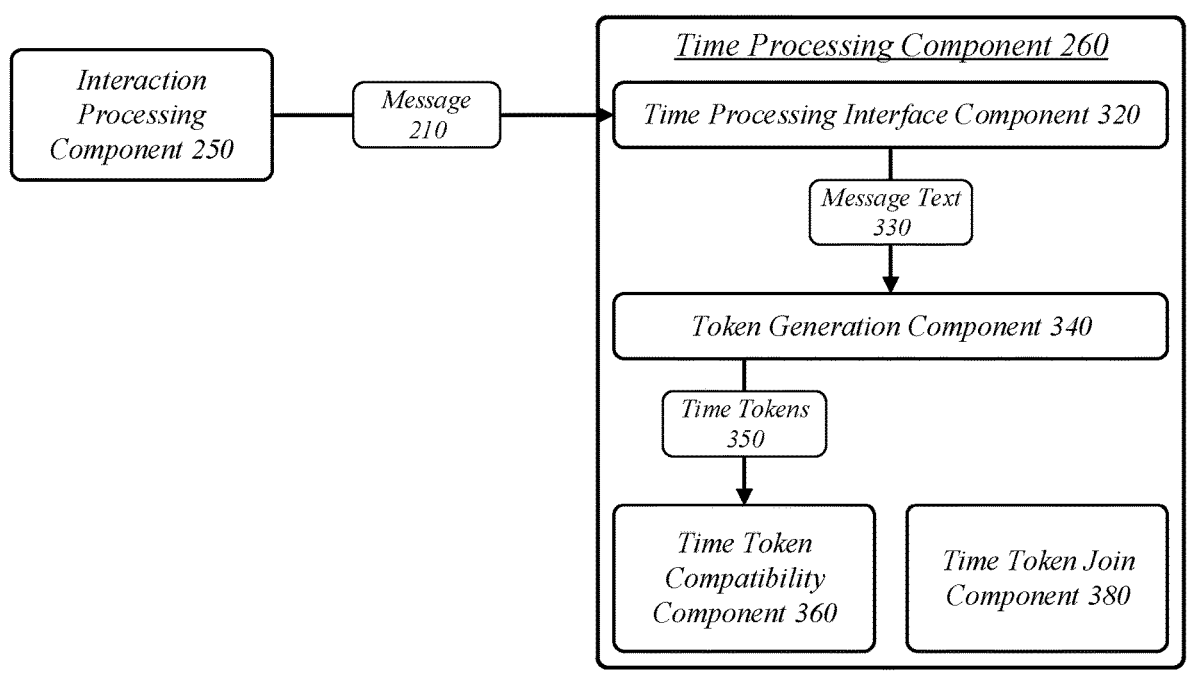
FIG. 3 illustrates an embodiment of a time intersection system performing a time token compatibility check of time tokens.

FIG. 3 illustrates an embodiment of a time intersection system 100 performing a time token compatibility check of time tokens 350.

A time processing interface component 320 of the time processing component 260 may receive a message 210 from an interaction processing component 250. The time processing interface component 320 may extract the message text 330 from the message 210 and may provide the message text 330 to a token generation component 340. The message text 330 may include the text, e.g. ASCII characters, of the message 210, without other information such as addresses, timestamps, identifiers, or other data used by the messaging systems but generally not seen or viewable by the users of the messaging system.

The token generation component 340 may extract one or more time tokens 350 from the message text 330. A time token 350 may include a sequence of numeric or alphabetic text that is known to represent a time and/or date, or that could represent a time and/or date. Examples of time tokens could include, for example and without limitation, "10", "pm", "January", "21$^{st}$", "Tuesday", "tomorrow", "afternoon", "2017", and so forth. In some cases, a time token 350 may be restricted to a sequence of characters not separated by blank space. For example, while the phrase "tomorrow afternoon at 2 pm" could be considered one time, the token generator component 340 may generate four time tokens: "tomorrow", "afternoon", "2", and "pm", rather than a longer token such as "2 pm". In other cases, multiple components of time information may be represented in one time token, for example, the text "3/10/17" may result in a generated single time token for the 10$^{th}$ of March in the year 2017.

The token generation component 340 may provide the time tokens 350 to a time token compatibility component 360. The time token compatibility component 360 may perform a compatibility check to determine if the different time tokens 350 can represent different aspects of the same time period, or if the time tokens 350 are incompatible, that is they represent different, non-overlapping time periods.

The time token compatibility component 360 may, for two different time tokens, attempt to join the two tokens into one combined time token to determine if the two time tokens are compatible. Two time tokens may be compatible if the time that each represents overlap in some way. For example, a "Tuesday" time token may be compatible with a "March" time token, because March includes Tuesdays, and the compatibility check would be positive. A "10" time token may not be compatible with a "12" time token, if each represents the same type of time, e.g. both are hours or both are dates. However, if one is an hour and the other is a date, then they may be compatible.

A given time token 350 may be represented as a time structure with a plurality of time fields, each time field representing a particular time granularity. For example, a time structure may include fields for: minute, hour, day of the week (e.g. Monday), month, year, day of the month (e.g. 27), day segment (e.g. evening, or pm), and so forth. A given time token may have a non-null, or specified, value in only one of the fields, or may have specified values in more than one field.

The time token compatibility component 360 may, for two different time tokens, compare like fields in the time structures of the two time tokens to each other to determine if the two tokens have incompatible, e.g. non-overlapping, time values. For example, if time token A has a day field that contains the value "Tuesday" and time token B has a day field that contains the value "Friday", then the two time tokens represent two different times, because Tuesday and Friday do not match. In such an instance, the compatibility test fails, and the result is negative.

Figure 4:
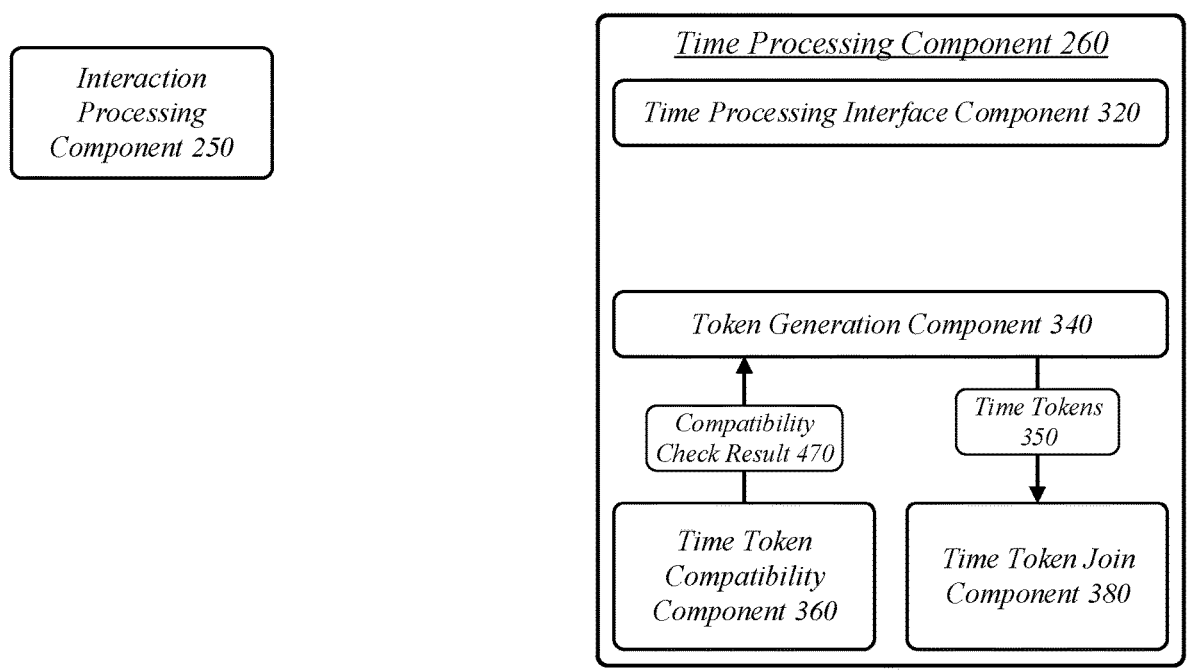
FIG. 4 illustrates an embodiment of a time intersection system performing a join attempt of time tokens in response to a time token compatibility check.

FIG. 4 illustrates an embodiment of a time intersection system 100 performing a join attempt of time tokens 350 in response to a time token compatibility check.

The time token compatibility component 360, having performed a compatibility check, returns a compatibility check result 470 to the token generation component 340. When the compatibility check result 470 is positive, the token generation component 340 provides the time tokens 350 to a time token join component 380. A positive compatibility check result 470 indicates that the time tokens 350 can overlap in some way, and are not mutually exclusive. When the compatibility check result 470 is negative, the time tokens may be provided to a messaging-based service without further action by the time processing component 260.

The time token join component 380 attempts to join the time tokens 350 into a combined time token. The time token join component 380 may, for example, generate a new time token data structure, and copy the values of each of the time tokens 350 into the new time toked data structure to form the combined time token. The time tokens 350 may be discarded by the time token join component 380. The time token join component 380 may select one of the time tokens 350 to be the combined time token, and may copy the values from the other time token(s) 350 into the selected time token, then discard the other time token(s). The embodiments are not limited to these examples.

Where more than two time tokens 350 are extracted from a message 210, the combined time token and a third time token may then be tested for compatibility by the time token compatibility component 360. If the compatibility check is positive, then the combined time token and the third token may be joined into a second combined time token by the time token join component 380. The process may be repeated until all compatible time tokens are joined into one combined time token.

In some embodiments, the components of the time processing component 260 may use memoization to further reduce the processing overhead in resolving time information. For example, when the time token compatibility component 360 determines whether two particular time tokens are compatible, the compatibility information for those two time tokens may be stored. The next time that the time token compatibility component 360 encounters those particular time tokens, the compatibility information may be retrieved from a storage rather than re-checked.

Figure 5:
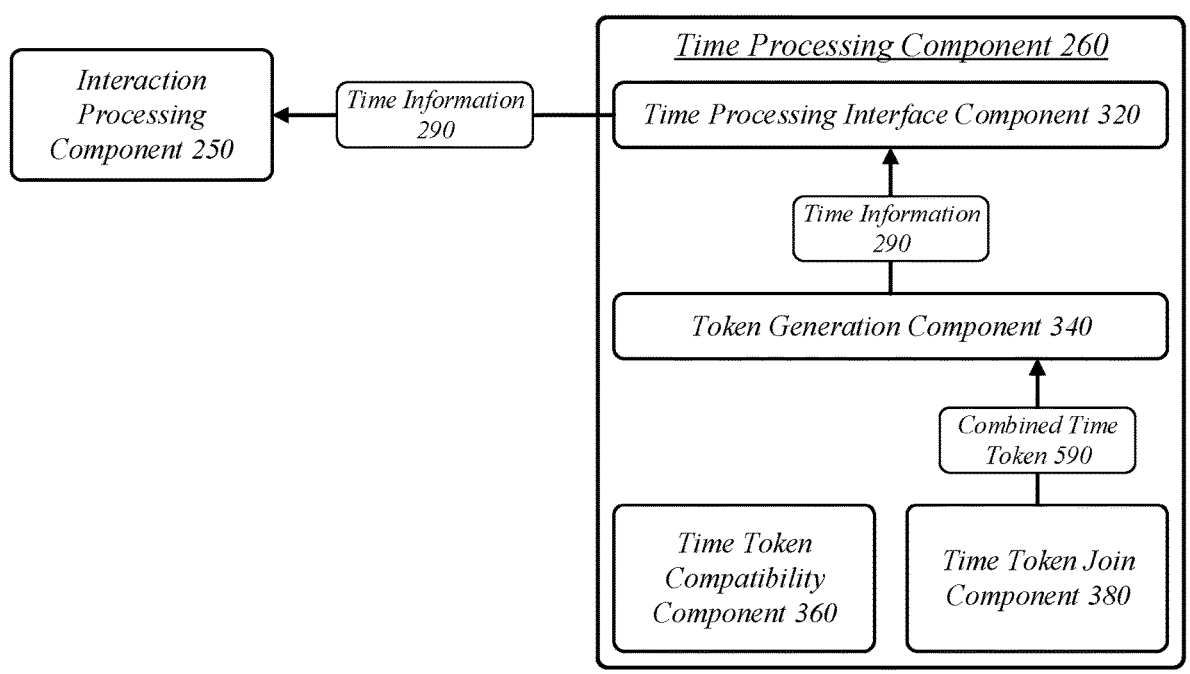
FIG. 5 illustrates an embodiment of a time intersection system generating time information based on a combined time token result of a time token compatibility check.

FIG. 5 illustrates an embodiment of a time intersection system 100 generating time information 290 based on a combined time token 590 result of a time token compatibility check.

The time token join component 380 may return the combined time token 590 to the token generation component 340. The token generation component 340 may resolve the combined time token 590 to a most-recent time instance. The most-recent time instance may represent a time period closest in time to a current time, either in the future or the past, corresponding to the values in the combined time token. For example, if the combined time token includes the values of "Tuesday $3^{rd}$", the next $3^{rd}$ of the month that falls on a Tuesday may be resolved. The resolved time information 290 may be provided to a messaging-based service by the time processing interface component 320.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a set of time tokens, the set of time tokens comprising at least a first time token and a second time token, at block 602. The time tokens may have been contained in and extracted from a message received by a messaging system.

The logic flow 600 may perform a compatibility check of joining the first time token and the second time token into a combined time token at block 604. The compatibility check may determine if the time tokens could represent overlapping periods of time, or are mutually exclusive.

The logic flow 600 may perform a join attempt of joining the first time token and the second time token into the combined time token where the compatibility check is positive at block 606. When the time tokens are not mutually exclusive, the time values of each time token may be combined into the combined time token.

The logic flow 600 may resolve the combined time token to a most-recent time instance at block 608. The most-recent time instance may represent a time period closest in time to a current time, either in the future or the past, corresponding to the values in the combined time token.

The logic flow 600 may provide the most-recent time instance to a messaging-based service at block 610. The messaging-based system may then be able to use the most-recent time instance to perform other functions, such as creating calendar entries, making a dining reservation, ordering transportation, and so forth.

The embodiments are not limited to this example.

Figure 7:
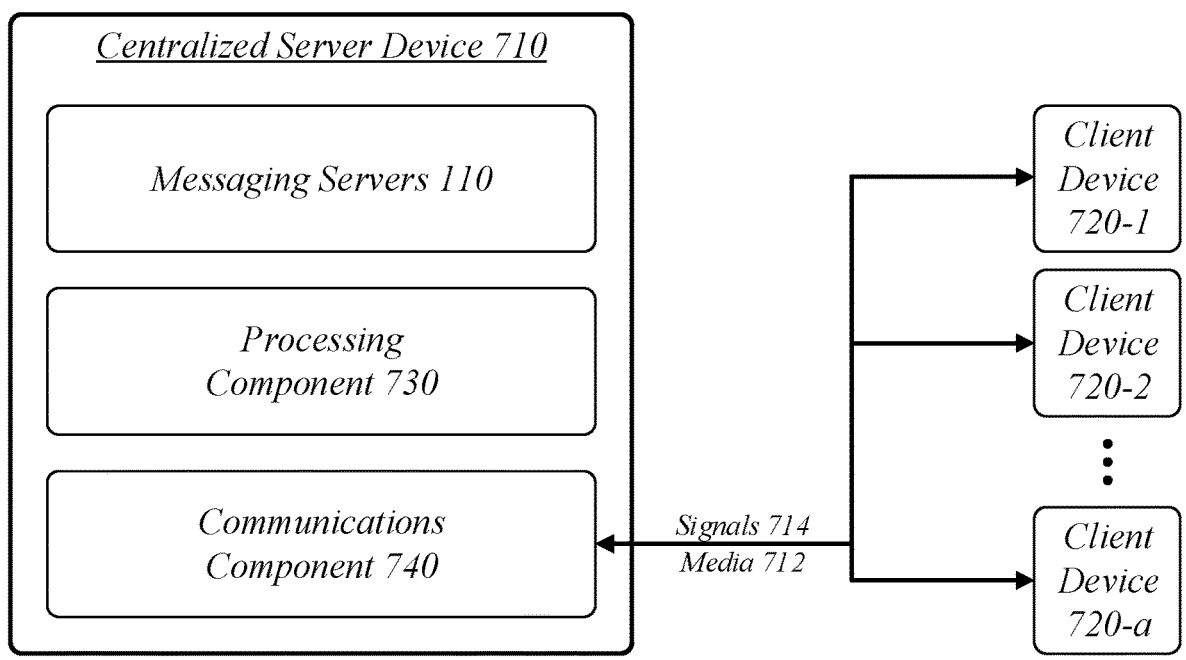
FIG. 7 illustrates an embodiment of a centralized system for the system of FIG. 1.

FIG. 7 illustrates a block diagram of a centralized system 700. The centralized system 700 may implement some or all of the structure and/or operations for the time intersection system 100 in a single computing entity, such as entirely within a single centralized server device 710.

The centralized server device 710 may comprise any electronic device capable of receiving, processing, and sending information for the time intersection system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 710 may execute processing operations or logic for the time intersection system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 710 may execute communications operations or logic for the time intersection system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 710 may implement the messaging servers 110 in a single computing entity. The centralized server device 710 may communicate with other devices over a communications media 712 using communications signals 714 via the communications component 740. The devices may be internal or external to the centralized server device 710 as desired for a given implementation. The centralized server device 710 may communicate with a plurality of client devices 720, such as may comprise the smartphone device 150, tablet device 160, personal computer device 180, sender client device 220, recipient client device 290, or any other client device.

Figure 8:
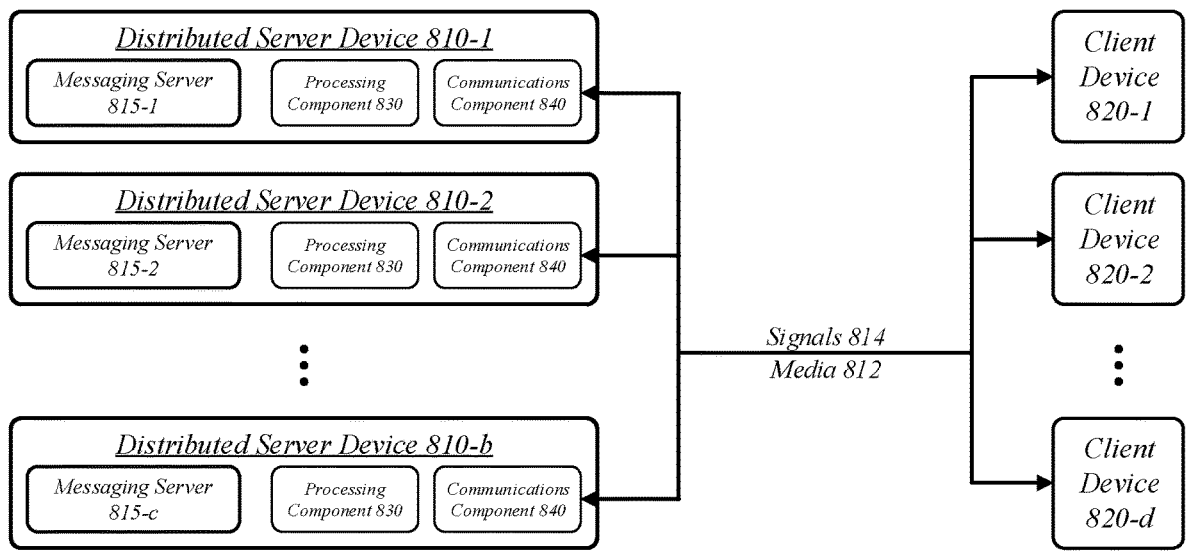
FIG. 8 illustrates an embodiment of a distributed system for the system of FIG. 1.

FIG. 8 illustrates a block diagram of a distributed system 800. The distributed system 800 may distribute portions of the structure and/or operations for the time intersection system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the distributed server devices 810 may be the same or similar to the centralized server device 710 as described with reference to FIG. 7. For instance, the distributed server devices 810 may each comprise a processing component 830 and a communications component 840 which are the same or similar to the processing component 730 and the communications component 740, respectively, as described with reference to FIG. 7. In another example, the distributed server devices 810 may communicate over a communications media 812 using communications signals 814 via the communications components 840.

The distributed server devices 810 may comprise or employ one or more server programs that operate to perform various methodologies in accordance with the described embodiments. In one embodiment, for example, the distributed server devices 810 may each implement one or more messaging servers 815. The messaging servers 815 may collectively implement the messaging time intersection system 100 as a distributed computing entity. The messaging servers 815 may communicate with a plurality of client devices 820, such as may comprise the smartphone device 150, tablet device 160, personal computer device 180, sender client device 220, recipient client device 290, or any other client device.

Figure 9:
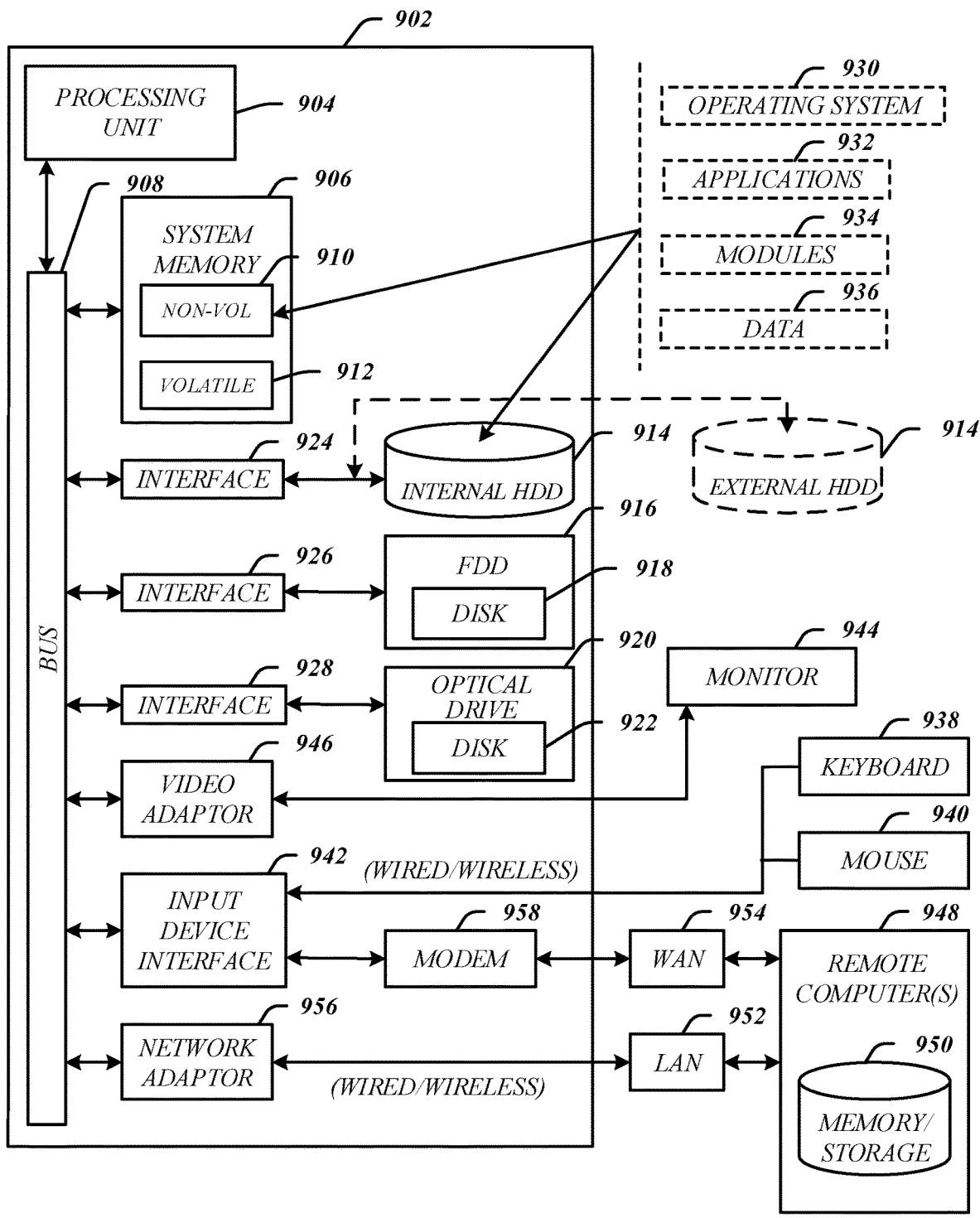
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the time intersection system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
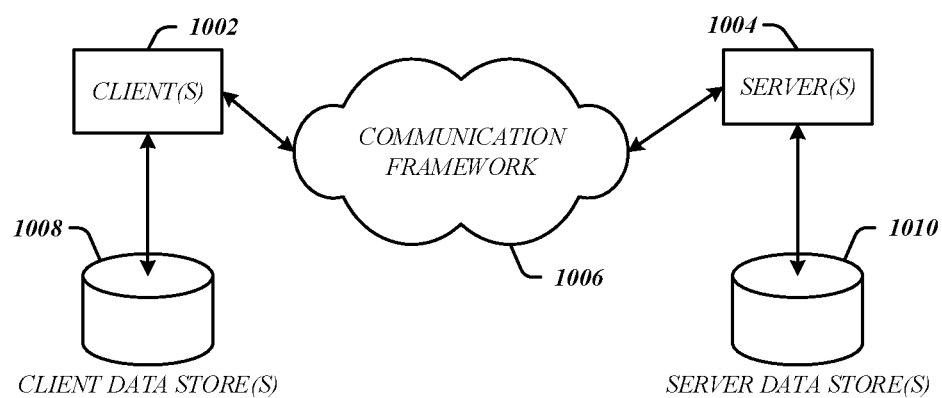
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may correspond to various client devices. The servers 1004 may implement the messaging servers 110. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
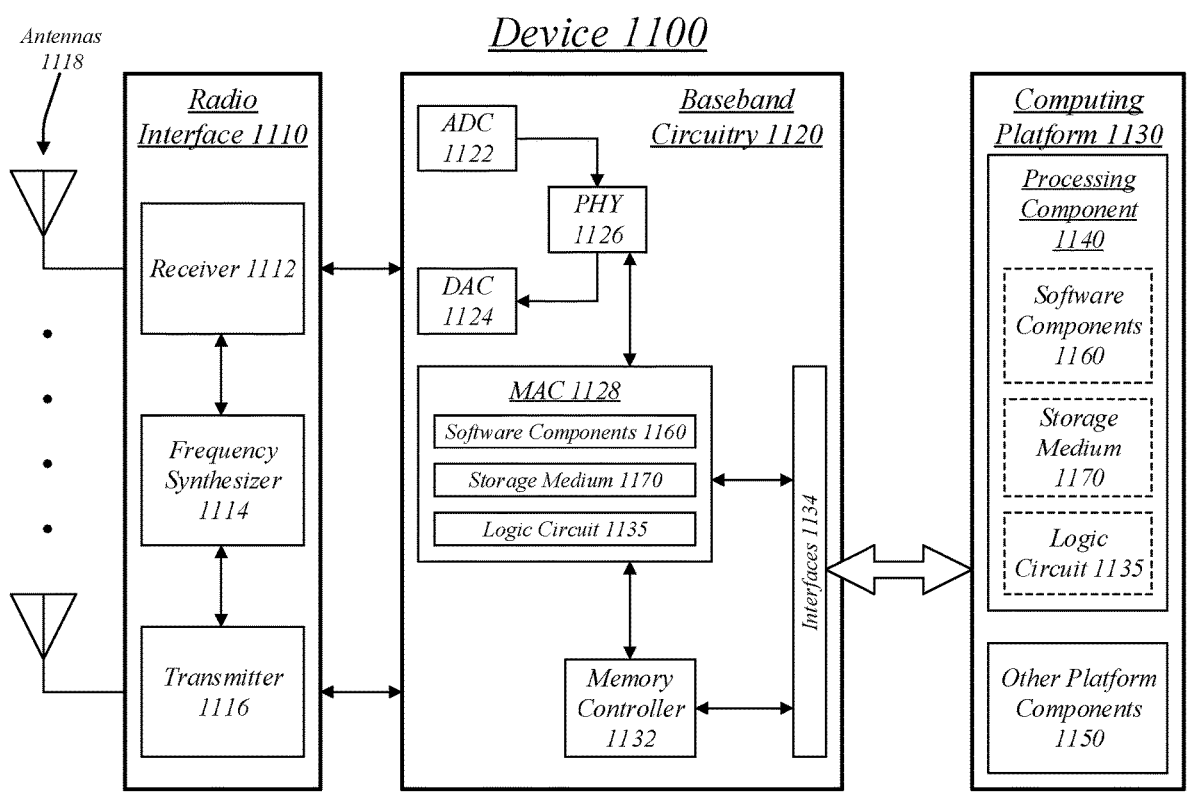
FIG. 11 illustrates an embodiment of a radio device architecture.

FIG. 11 illustrates an embodiment of a device 1100 for use in a multicarrier OFDM system, such as the time intersection system 100. Device 1100 may implement, for example, software components 1160 as described with reference to time intersection system 100 and/or a logic circuit 1135. The logic circuit 1135 may include physical circuits to perform operations described for the time intersection system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the time intersection system 100 and/or logic circuit 1135 in a single computing entity, such as entirely within a single device. Alternatively, the device 1100 may distribute portions of the structure and/or operations for the time intersection system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the time intersection system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a set of time tokens, the set of time tokens comprising at least a first time token and a second time token; performing a compatibility check of joining the first time token and the second time token into a combined time token; and performing a join attempt of joining the first time token and the second time token into the combined time token where the compatibility check is positive.

A computer-implemented method may further comprise receiving a text string; and extracting the first time token and the second time token from the text string. The text string may be received in a message sent via a messaging server in a messaging interaction.

A computer-implemented method may further comprise resolving the combined time token to a most-recent time instance; and providing the most-recent time instance to a messaging-based service.

A computer-implemented method may further comprise providing both the first time token and the second time token to a messaging-based service where the compatibility check is negative.

A computer-implemented method may further comprise, for a set of time tokens comprising at least the first time token, the second time token, and a third time token, performing a second compatibility check of joining the third time token and the combined time token into a second combined time token; and performing a second join attempt of joining the third time token and the combined time token into the second combined time token where the second compatibility check is positive.

The first time token may be represented as a first time structure, the second time token represented as a second time structure, wherein the first time structure and second time structure comprise a plurality of time fields, wherein each time field of the plurality of time fields represents a particular granularity. The computer-implemented method may further comprise performing the compatibility check of joining the first time token and the second time token into the combined time token comprises matching same-granularity time fields from the first time structure and the second time structure to determine whether the first time structure and the second time structure have specified time fields with incompatible values. The plurality of time fields may comprise at least a minute field, an hour field, a day field, a month field, and a year field. At least one time field of the plurality of time fields of at least one of the first time structure and the second time structure may be set to an unspecified value.

An apparatus may comprise a time processing interface component operative to receive a set of time tokens, the set of time tokens comprising at least a first time token and a second time token; a time token compatibility component operative to perform a compatibility check of joining the first time token and the second time token into a combined time token; and a time token join component operative to perform a join attempt of joining the first time token and the second time token into the combined time token where the compatibility check is positive.

The apparatus may further comprise a token generation component operative to receive a text string in a message sent via a messaging server in a messaging interaction; and extract the first time token and the second time token from the text string.

The apparatus may further comprise a token generation component operative to resolve the combined time token to a most-recent time instance; and the time processing interface component operative to provide the most-recent time instance to a messaging-based service.

The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
    receiving a set of time tokens, the set of time tokens comprising at least a first time token represented as a first time structure and a second time token represented as a second time structure, wherein the first and second time structures comprise a plurality of time fields, wherein each time field of the plurality of time fields represents a particular granularity;
    performing a compatibility check of joining the first time token and the second time token into a combined time token; and
    performing a join attempt of joining the first time token and the second time token into the combined time token where the compatibility check is positive.

2. The method of claim 1, further comprising:
    receiving a text string; and
    extracting the first time token and the second time token from the text string.

3. The method of claim 2, the text string received in a message sent via a messaging server in a messaging interaction.

4. The method of claim 1, further comprising:
    resolving the combined time token to a most-recent time instance; and
    providing the most-recent time instance to a messaging-based service.

5. The method of claim 1, further comprising:
    providing both the first time token and the second time token to a messaging-based service where the compatibility check is negative.

6. The method of claim 1, the set of time tokens comprising at least the first time token, the second time token, and a third time token, further comprising:
    performing a second compatibility check of joining the third time token and the combined time token into a second combined time token; and
    performing a second join attempt of joining the third time token and the combined time token into the second combined time token where the second compatibility check is positive.

7. The method of claim 1, wherein performing the compatibility check of joining the first time token and the second time token into the combined time token comprises matching same-granularity time fields from the first time structure and the second time structure to determine whether the first time structure and the second time structure have specified time fields with incompatible values.

8. An apparatus, comprising:
    a processor; and
    a memory storing instructions which when executed by the processor cause the processor to:
        receive a set of time tokens, the set of time tokens comprising at least a first time token, a second time token, and a third time token;
        perform a compatibility check of joining the first time token and the second time token into a combined time token;
        perform a join attempt of joining the first time token and the second time token into the combined time token where the compatibility check is positive;
        perform a second compatibility check of joining the third time token and the combined time token into a second combined time token; and
        perform a second join attempt of joining the third time token and the combined time token into the second combined time token where the second compatibility check is positive.

9. The apparatus of claim 8, the memory storing instructions which when executed by the processor cause the processor to:
    receive a text string in a message sent via a messaging server in a messaging interaction; and
    extract the first time token and the second time token from the text string.

10. The apparatus of claim 8, the memory storing instructions which when executed by the processor cause the processor to:

resolve the combined time token to a most-recent time instance; and provide the most-recent time instance to a messaging-based service.

11. The apparatus of claim 8, the first time token represented as a first time structure, the second time token represented as a second time structure, wherein the first time structure and second time structure comprise a plurality of time fields, wherein each time field of the plurality of time fields represents a particular granularity.

12. The apparatus of claim 11, wherein performing the compatibility check of joining the first time token and the second time token into the combined time token comprises matching same-granularity time fields from the first time structure and the second time structure to determine whether the first time structure and the second time structure have specified time fields with incompatible values.

13. At least one non-transitory computer-readable storage medium comprising instructions that, when executed, cause a system to:

receive a set of time tokens, the set of time tokens comprising at least a first time token represented as a first time structure and a second time token represented as a second time structure, wherein the first and second time structures comprise a plurality of time fields, wherein each time field of the plurality of time fields represents a particular granularity;

perform a compatibility check of joining the first time token and the second time token into a combined time token; and perform a join attempt of joining the first time token and the second time token into the combined time token where the compatibility check is positive.

14. The computer-readable storage medium of claim 13, comprising further instructions that, when executed, cause a system to:

receive a text string in a message sent via a messaging server in a messaging interaction; and extract the first time token and the second time token from the text string.

15. The computer-readable storage medium of claim 13, comprising further instructions that, when executed, cause a system to:

resolve the combined time token to a most-recent time instance; and provide the most-recent time instance to a messaging-based service.

16. The computer-readable storage medium of claim 13, the set of time tokens comprising at least the first time token, the second time token, and a third time token, comprising further instructions that, when executed, cause a system to:

perform a second compatibility check of joining the third time token and the combined time token into a second combined time token; and perform a second join attempt of joining the third time token and the combined time token into the second combined time token where the second compatibility check is positive.

17. The computer-readable storage medium of claim 13, wherein performing the compatibility check of joining the first time token and the second time token into the combined time token comprises matching same-granularity time fields from the first time structure and the second time structure to determine whether the first time structure and the second time structure have specified time fields with incompatible values.

* * * * *